Sept. 27, 1966 J. J. HAGOPIAN 3,275,995

DATA HANDLING SYSTEM

Filed Dec. 23, 1963 4 Sheets-Sheet 1

INVENTOR.
JACOB J. HAGOPIAN

BY *Fraser and Bogucki*

ATTORNEYS

INVENTOR.
JACOB J. HAGOPIAN
BY Fraser and Bogucki
ATTORNEYS

Sept. 27, 1966 J. J. HAGOPIAN 3,275,995

DATA HANDLING SYSTEM

Filed Dec. 23, 1963 4 Sheets-Sheet 3

INVENTOR.
JACOB J. HAGOPIAN

BY Fraser and Bogucki

ATTORNEYS

DATA HANDLING SYSTEM

Filed Dec. 23, 1963

INVENTOR.
JACOB J. HAGOPIAN
BY Fraser and Bogucki
ATTORNEYS

United States Patent Office 3,275,995

Patented Sept. 27, 1966

3,275,995

DATA HANDLING SYSTEM

Jacob J. Hagopian, San Jose, Calif., assignor to International Business Machines Corporation, New York, N.Y., a corporation of New York Filed Dec. 23, 1963, Ser. No. 332,542

14 Claims. (Cl. 340—172.5)

This invention relates to data processing systems, and more particularly to systems for receiving, storing and providing data asynchronously as well as synchronously, and for transferring digital data at different data transfer rates between data processers having different information handling capacities.

Viewed in a broad sense, the various data storage systems used with modern data processing equipment constitute time domain buffers which serve to preserve the data between the time that it is supplied and the time that it is demanded by different units of a system. The history of data processing equipment has seen constant improvement in the means for performing calculating and processing functions, the means for performing storage functions, and the means for providing input and output functions. It may be said, however, that improvements in the performance of calculating and processing functions have considerably exceeded improvements in the performance of the associated equipment, both in terms of increased versatility and reduced cost. The principal storage and buffer mechanisms, for example, still include punched card, punched tape and magnetic tape systems. Although each of these types of systems has been constantly improved in performance, the improvements have not changed the basic characteristics of the systems.

Punched card and punched tape equipment is most widely used for performance of the data input function because such equipment can operate asynchronously. Whether input data is provided by an operator at a typewriter, at a keypunch or by other manual means, or whether the data originates from automatic means, it is usually derived at a relatively slow rate or is intermittent in character, so that the input device must also be capable of intermittent (i.e. asynchronous) operation. For data processing and communication applications, in which data is operated on or transferred synchronously at a much higher rate, systems such as digital magnetic tape transports are most widely used. Although the magnetic tape transports are capable of bidirectional operation and high speed start/stop operation, they are nonetheless synchronous because they are brought up to a selected operating speed before data transfer takes place, and because they record at selected standard bit densities so that they have data transfer rates compatible with that of the system with which they are associated. It has not heretofore proven to be feasible to utilize such magnetic tape recorders on an asynchronous basis except for the recording of data, and then only by relatively specialized and expensive units.

While magnetic tape systems provide relatively high data transfer rates and relatively high data storage densities, punched card and punched tape systems operate, at best, at much slower rates. In addition, the data density on such media is so much lower that storage of the volumes of data which are typically handled by modern data processing machines becomes extremely cumbersome. In addition, record members of these types are not reuseable, and are therefore expensive when used in high data volume applications.

It has accordingly become the practice to utilize asynchronous and synchronous devices for their specialized applications, and to transfer information between these devices through the use of intermediate time base conversion and data storage equipment. Thus, data from punched cards may be fed into a random access memory, at relatively slow speed, and then a block of data may be fed from the random access memory to a magnetic tape system at relatively high sped, in synchronism with the operation of the magnetic tape system. Like conversion equipment is utilized when going from a magnetic tape storage to an output device, such as an output printer. In a typical example, a line of data for a line-at-a-time printer will be fed from a magnetic tape storage into a random access memory, and then used for actuation of the high speed line-at-a-time printer. These systems are not only inherently expensive, in that they involve several units of equipment, but they are also specialized and limited to the performance of the specific conversion and output functions for which they are designed.

An excellent example of the type of modern data processing and communication system which involves data input, time domain buffering, and data output functions is provided by the type of data processing system which transmits data between remote points over standard telephone lines. A volume of data which is available for transmission may be encoded by a keyboard operator, then transmitted serially over the telephone line at a much higher rate of speed to the distant station, and then printed out. Such a system requires that the asynchronously provided input data be accumulated as received, reproduced synchronously for transmission, recorded synchronously after transmission, and that the data be again reproduced, asynchronously. Such a system corresponds to a teletypewriter installation in which prepared tapes are used for transmission at a higher rate of speed than can be achieved by the keyboard operator. Many such systems are known, most of which utilize punched tape input and output equipment. Such equipment not only becomes expensive when modified to meet high performance situations, but even the best of such systems has a limited data transfer rate. For example, while a very high speed tape reader can operate at 1000 characters per second a high speed tape punch can seldom operate at over 200 characters per second. Additionally, of course, the bulkiness of the paper tape and its non-reuseability are material disadvantages.

A magnetic tape system capable of asynchronous as well as synchronous operation will be seen to provide in most economical fashion the functions of buffering, storage and time base compression and expansion. In addition, it is highly desirable for such systems to readily provide the functions of converting data into the serial form needed for transmission, and also to provide ready verification of the input data. It is desired that a check of this nature be made directly at the input point, and that the check which is made verify the correctness of the character on the record medium at the input point.

Accordingly, it is an object of the present invention to provide an improved data handling device for use in data processing systems.

Another object of the present invention is to provide an improved form of data buffer, capable of converting data from asynchronous to synchronous time bases.

Another object of the present invention is to provide an improved data transmission buffering device which transmits keyboard originated information to data processing equipment operating at higher transfer rates.

Yet another object of the present invention is to provide an improved form of data communications system.

Yet another object of the present invention is to provide a data transmission buffer for recording multibit characters encoded by a keyboard operation in serial fashion on a magnetic tape for later reproduction at high speed for data transmission and processing systems.

A further object of the present invention is to provide an improved input buffer device, which operates asynchronously in response to input information while continuously providing verification of recorded data.

Yet another object of the present invention is to provide an improved system for recording keyboard originated information in serial fashion for later high speed readout, in such manner that the data recorded is easily monitored, erased and corrected.

These and other objects are accomplished in accordance with the invention by providing an improved data transmission buffer system employing a magnetic tape as a recording medium. The multi-digit character representations are intermittently received as parallel binary digits (bits) from a keyboard to be recorded in serial bit-by-bit fashion on the magnetic tape. The parallel data bits are recorded by a magnetic recording transducer adapted to receive parallel inputs and to record these inputs simultaneously in proper serial order on the tape. During recording, the tape is driven forward in fixed increments to accommodate each successive character from the keyboard.

The structure of the recording transducer also includes means for reproducing the recorded data from the tape. The producing means includes a read gap disposed closely adjacent and downstream of the recording elements on the transducer. By this means, the recorded bits of a character pass the read gap and are reproduced as the tape is advanced a fixed increment to receive the next character. Thus, the serially recorded bits of each character are reproduced to be checked for error before receipt of the next character. In the event that an error does occur, the tape may be moved a fixed increment backward by means of a backspace device to permit the proper character to be recorded.

After a complete message or data sequence has been recorded properly by the keyboard operator, the tape may then be rewound to its starting position, and later advanced at high speed past the reading gap to transmit the bits of the recorded characters in serial fashion to a receiving system having a high speed data handling capability. In addition, the character data recorded on the tape may be selectively changed or corrected, as desired. When the recorded material is no longer needed, the magnetic tape may be conveniently erased to permit the recording of another message or data sequence for high speed transmission.

The foregoing and other objects, features and advantages of the invention will be apparent from the following more particular description of a preferred embodiment of the invention, as illustrated in the accompanying drawings.

Figure 1:
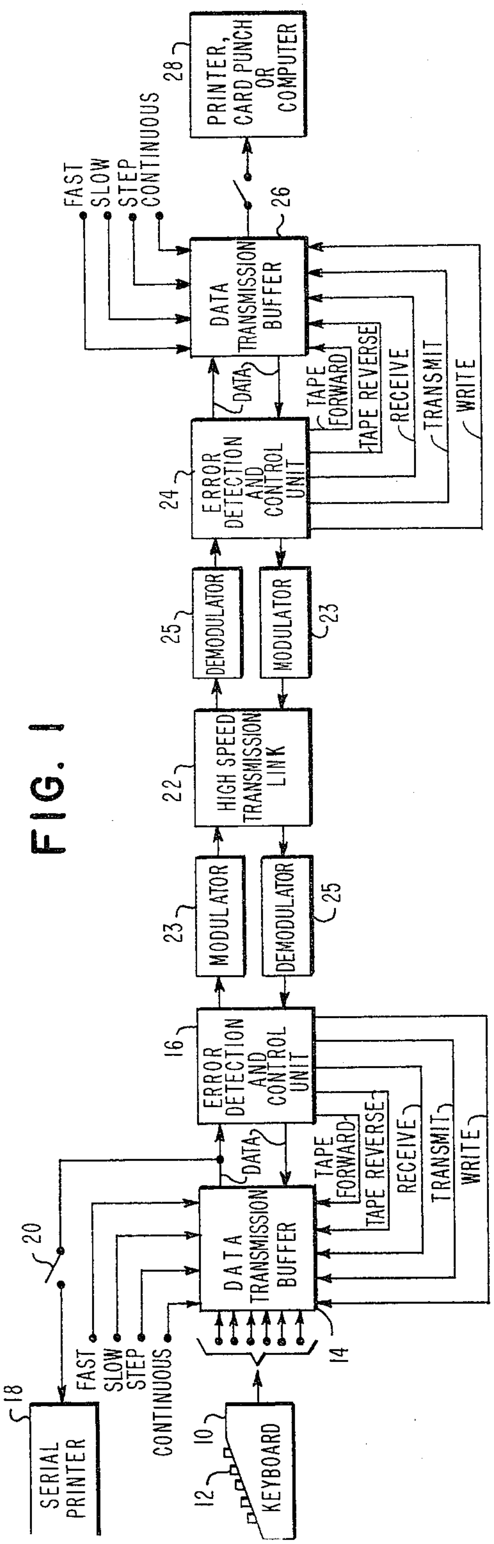
FIGURE 1 is a schematic diagram illustrating in block diagram form the principal elements of a data transmission system using data transmission buffer units in accordance with the invention.

Referring now to FIG. 1, there is illustrated a typical data transmission system, such as may advantageously employ a data transmission buffer in accordance with the invention. Characters representing letters, numbers and the like are introduced into the system by the operation of an encoding keyboard 10. During recording of a message, the keyboard operator depresses selected keys 12 corresponding to the desired characters in the same manner one would operate an ordinary typewriter or teletypewriter. The keyboard 10 may, for example, provide a coded output consisting of six binary digits (bits) for identifying each character. Typically a six digit binary code may be used to identify any one of sixty-four different characters.

In particular, encoding keyboards of a well known type utilize a bank of six parallel code bars mechanically interrelated with various key operated code levers. When a particular code lever is selected by depressing the associated key, selected ones of the code bars are freed to move upon the release of a code bar bail to open their respective code contacts. Each code contact remaining closed produces a pulse thus providing a coded output consisting of six parallel binary digits.

Since the details of the particular keyboard employed do not constitute a feature of this invention, a complete description is not necessary to an understanding of the invention. Therefore, further description of the keyboard 10 will not be included herein, except where helpful in describing the operation of a data transmission buffer unit in accordance with the invention.

The six binary digits representing each character are delivered in parallel fashion to the input of a data transmission buffer unit 14 constructed in accordance with the invention. The buffer unit 14 may be operated under the control of an error detection and control unit (EDC unit) 16 and of various manual control settings, as will be explained in detail hereinafter. During operation of the keyboard 10, the buffer unit 14 records the parallel bits in serial bit-by-bit fashion on successive fixed increments of a magnetic tape. The serially recorded bits are then serially reproduced as the tape is advanced to the next character position, and may be provided to a serial printer 18 that contains serial decoders for identifying each character. The character so identified is printed so that the recorded message may be checked by the operator for error on a character-by-character basis. Accordingly, a character erroneously inserted in the message can be immediately detected and corrected.

As a message is being inserted from the keyboard 10, the data transmission buffer unit 14 is set for incremental operation by selecting both the "slow" and the "step" manual settings and, if desired, by closing a switch 20 to the serial printer 18. The buffer unit 14 is then controlled solely by the operation of the keyboard 10, and the tape is advanced in step-by-step fashion from one character position to the next. The data transmission buffer 14 is under the control of the error detection and control unit 16 during high speed transmission operations.

After a complete message has been recorded on the tape, preferably in 150 character blocks with 10-character interblock gaps, the manual "fast" and "continuous" settings are selected and the switch 20 is opened to prepare the buffer unit 14 for transmission of the message. The buffer unit 14 then operates automatically under control of the error detection and control unit 16. A "tape reverse" command signal then rewinds the tape at high speed. After rewinding to the beginning of the message, the buffer unit awaits a "transmit" plus a "tape forward" command signal to begin transmission.

The error detection and control (EDC unit) 16 may be connected through modulator circuits 23 and demodulator circuits 25, and a high speed transmission link or line 22 to another error detection and control unit (EDC unit) 24 via like modulator and demodulator circuits 23 and 25, respectively, at the receiving end of the system.

Such EDC units are commonly employed in data transmission systems to compare the signal transmitted at one end of the line with the signal received at the other end. In general terms, a message is transmitted at high speed in 150-character blocks to the EDC unit 24 to be recorded in a receiving buffer unit 26. At the end of each block, the interblock gap is sensed to stop the transmission. During this interval, the direction of transmission is momentarily reversed, so that a 10-bit parity character generated in the EDC unit 24 may be sent back to be compared with a similar parity character in the EDC unit 16. If the parity characters are not identical, then the tapes at both ends of the line 22 are automatically rewound to retransmit the block correctly. After one block has been correctly transmitted, then the next block is sent to be recorded and checked for parity.

Before a transmitted message can be recorded at the receiving end, the "fast" and "continuous" manual settings of the buffer unit 26 are preselected so that the tape travels at the same speed as the tape in the transmitting buffer unit 14. As transmission begins, "forward" and "receive" command signals are generated by the EDC unit 24 to initiate the serial recording operation of the buffer 26. After the complete message has been recorded and checked for parity, the manual settings may be switched to "slow" and "step," and a switch 28 closed to couple the output of the buffer unit 26 to a low speed printer, card punch or computer unit 28. Subsequently, the tape advances in step-by-step fashion under control of the associated output device to deliver the message characters one at a time in serial bit-by-bit fashion to the printer, card punch or computer terminal unit 28. The installations at the input and output points of a transmission link system will usually be substantially alike, in order to operate for both sending and receiving, but are shown here in slightly different form in order to facilitate description.

It should be understood that such a data transmission system provides a wide variety of operations. For example, if the terminal unit 28 is a high speed computer having an operating range significantly in excess of the data transmission speed, then the "slow" speed setting for the receiving buffer 26 may be made to correspond to the "fast" speed setting on the transmitting buffer 14, and the "fast" speed setting of the receiving buffer 26 made to correspond to the higher data handling speed range of the high speed computer. In such a case, the "continuous" setting would be maintained during the time that the message is being transferred from the buffer 26 to the computer 28.

The data transmission system described hereinabove is compatible with a variety of data transmission and processing systems currently being employed, such as various installations for transmitting data over standard narrow band telephone links. The increased speed range available with the data transmission buffers in accordance with the invention permits use of high speed transmission links not previously available for directly transmitting keyboard originated data information.

Figure 2:
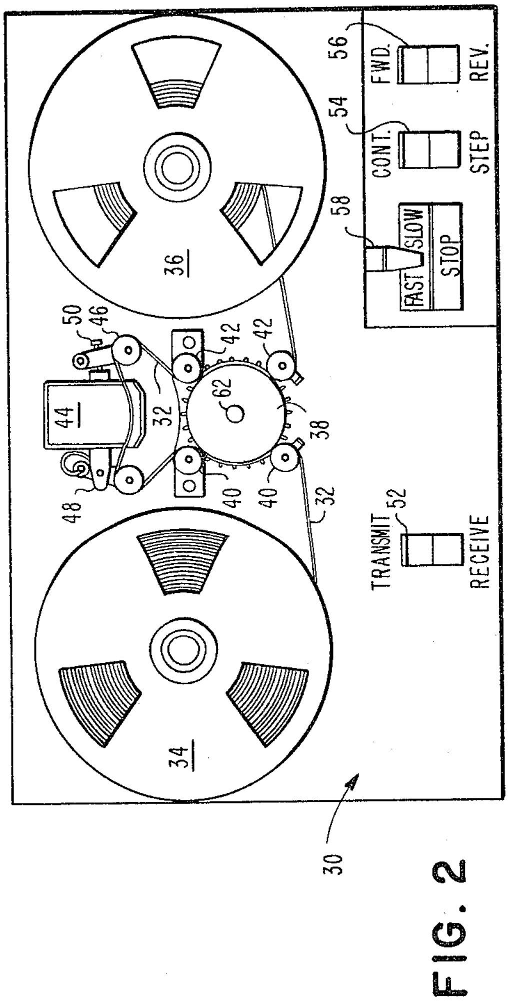
FIG. 2 is a plan view of a preferred embodiment of a data transmission buffer unit illustrating the tape handling apparatus.

Referring now to FIG. 2, the tape handling apparatus of a data transmission buffer unit in accordance with the invention (sometimes referred to as a line speed buffer in certain applications) is shown mounted on a front panel 30 along with various control switches. During recording and reproducing of the data, a magnetic tape 32 having a longitudinal recording track is driven from a supply reel 34 to a takeup reel 36, both reels being mounted for rotation on the front panel 30. The tape 32 is moved longitudinally by the rotation of a sprocket wheel 38 having sprockets equally spaced around the periphery to engage sprocket holes provided along at least one edge of the tape. The tape 32 is held in engagement with the sprockets over equal arcs on opposite sides of the sprocket wheel by oppositely disposed pairs of idler rollers 40 and 42.

As the sprocket wheel rotates, the tape moves past a multiple gap magnetic head assembly 44 in a closed loop path, sometimes referred to as a tight loop tape feed. This closed loop tape path is defined by an adjustable idler roller 46 and a spring loaded idler roller 48, the two rollers being located on opposite sides of the magnetic head 44. Ideally, the face of the magnetic head assembly 44 is mounted on the axis of symmetry of the tape loop and positioned between the idler rollers 46 and 48 to produce a tape wrap angle of approximately twenty-five degrees. A constant tension is maintained on the tape loop by the outward force exerted by the spring loaded idler roller 48, even during starting and stopping. The screw adjustment 50 on the adjustable idler roller 46 may be used to align previously recorded spaces on the tape 32 with corresponding gaps in the head assembly 44. One advantage of this arrangement is that, when the tape direction is switched between forward and reverse, tape blacklash is prevented since the diametrically opposite sprocket teeth engage the leading edges of the sprocket holes on one side and the trailing edges on the other side.

Various manual settings are also contained on the front panel of the buffer 30. As shown, there are three two-position switch actuators: a transmit-receive button 52, a continuous-step button 54, and a forward-reverse button 56. In addition, a three-position lever arm 58 permits selection of a fast or a slow speed operation and has a center stop position.

Figure 3:
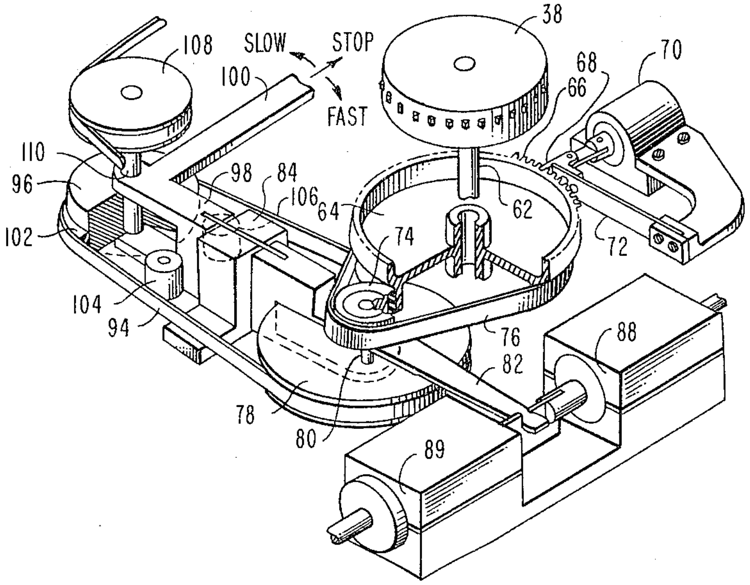
FIG. 3 is a partial perspective view illustrating the arrangement of certain tape driving elements of the data transmission buffer unit of FIG. 2.
Figure 4:
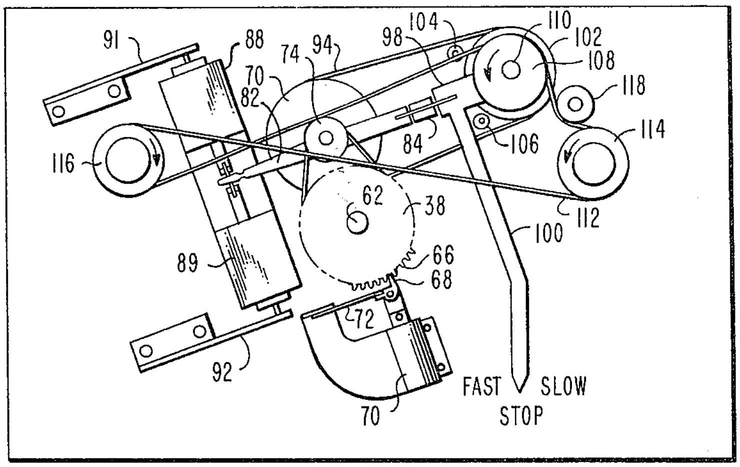
FIG. 4 is a top view of the buffer unit of FIG. 2 with the front panel removed to illustrate the tape driving system.

A preferred form of tape drive system for the buffer unit is illustrated in FIGS. 3 and 4. The perspective view of FIG. 3 best illustrates the important elements of the driving system for obtaining fast or slow, forward or reverse, and intermittent or continuous operation. A shaft 62 couples the sprocket wheel 38 for rotation with a sprocket pulley 64 that has detents 66 equally spaced around the periphery of an upper shoulder. A detent pin 68, operated by a solenoid 70, is normally urged into engagement with the detents 66 by the action of an attached spring 72. When the solenoid 70 is actuated by a current flow, the detent pin 68 is withdrawn against the force of the spring 72 to allow the sprocket pulley to rotate.

The sprocket pulley 64 may be rotated in either direction by a drive pulley 74, preferably having a resilient rubber drive surface. The drive pulley 74 is normally maintained at a center position with its drive surface out of engagement with both a lower rim of the detent pulley 64 and the inner-surface of a belt 76 that engages the lower rim of the detent pulley 64. A common shaft 80 held in bearings and a movable arm 82 couples the drive pulley 74 for rotation by a drive idler 78. A flexible sheet metal cantilever spring engages adjacent slots in the movable arm 82 and a central stationary block 84 so that the arm is pivotally attached to the block. The other end of the arm 82 is held by a rigid coupling between the armature of a forward solenoid 88 and a reverse solenoid 89. When the forward solenoid 88 is actuated, the arm 82 moves to bring the drive pulley 74 into engagement with the lower rim of the detent pulley 64 to drive the sprocket wheel 38 in the forward direction. On the other hand, when the reverse solenoid 89 is actuated, the drive pulley 74 engages the inner-surface of the drive belt 76 to urge the detent pulleys 64 in the reverse direction at the same speed as in the forward direction. As shown in FIG. 4, a pair of springs 91 and 92 engage the outer rims of the two solenoid armatures to provide a restoring force to return the arm 82 to its center pivotal position after actuation of one of the solenoids 88 or 89.

A connecting belt 94 couples the drive idler 78 for rotation with a speed change idler 96, which is carried by another arm 98 pivotally mounted on the other side of the stationary block 84. The arm 98 and the attached speed change idler 96 may be moved into one of three pivotal positions by means of an extending speed change lever 100, which has fast, slow or center-stop positions. With the lever 100 in the center-stop position, a rubber surface 102 on the speed change idler 96 is held out of engagement with both a low speed capstan 104 and a high speed capstan 106, one being located on either side of the arm 98. A common synchronous motor (not shown) drives both the high and low speed capstans 104 and 106 through appropriate high and low speed gearing. By moving the lever 100 in either direction, the rubber surface 102 of the speed change idler 96 is moved into engagement with one or the other of the continuously rotating capstans 104 or 106.

A tape takeup drive pulley 108, coupled by means of a shaft 110, is rotated with the speed change idler 96. A belt 112 couples the tape takeup drive pulley 108 to rotate a pair of tape reel drive pulleys 114 and 116 in opposite directions. The rotating tape reel drive pulleys 114 and 116 provide the takeup torque for the tape reels 36 and 34, respectively, through associated friction drag clutches (not shown). By this arrangement, the tape on either side of the sprocket wheel 38 is kept fully wound on the reels 34 and 36. As shown, a low friction guide roller 118 may be placed appropriately in the tape path to increase the tape wrap angle around the tape takeup drive pulley 108 and the tape reel drive pulley 114.

Figure 5:
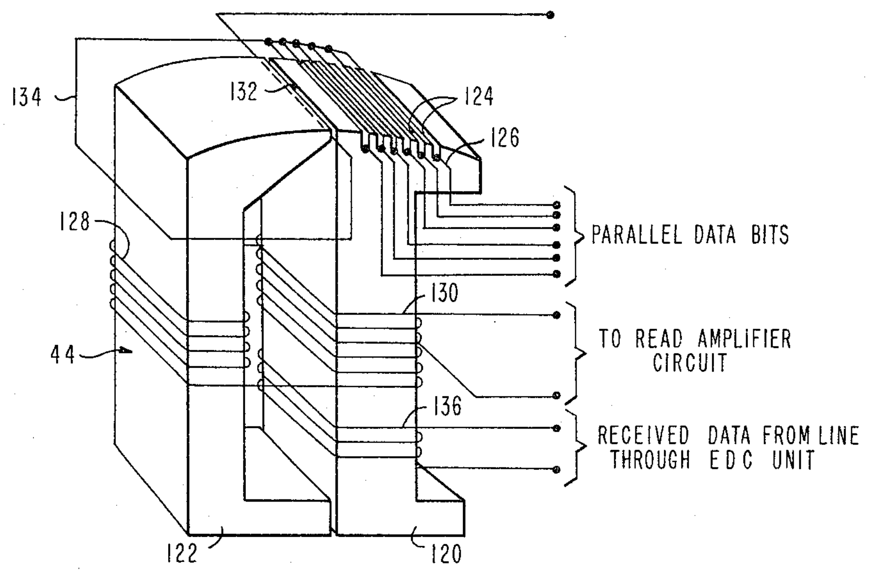
FIG. 5 is a simplified schematic representation of the details of a magnetic transducer, which may be advantageously employed in the buffer unit of FIG. 2.

Referring now to FIG. 5, which illustrates schematically some of the details of the magnetic head core assembly 44, the core assembly may be considered as consisting of a writing core structure 120 and a reading core structure 122. The body of the core is formed of any suitable magnetic material and may be of unitary structure, such as a ferrite core, or comprise a plurality of laminations. The face of the writing core structure 120 has a closely spaced plurality of slots 124 into which individual write conductors 126 are placed. In particular, the write conductors 126 may be formed of individual thin strips of electrically conductive materials such as brass, the strips being formed to fit the slots 124. When the write portion of the core 120 is formed of an electrically conductive material, it is also necessary to provide a nonconductive collar or jacket on each of the strips to electrically insulate them from the core structure and from each other. An end of each of the conductive strips 126 is electrically coupled to receive the parallel bits from a keyboard or other data source. The bits appear as current pulses through selected ones of the conductors 126 to be magnetically recorded longitudinally on the adjacent magnetic tape.

The read core structure 122 cooperates with the writing core structure 120 to provide a suitable means for reproducing the bits recorded on the tape. A pair of serially wound read coils 128 and 130 may be mounted on the core portions 120 and 122. The face of the read core portion 122 is separated from the face of the write core portion 120 by a shim 132 of a suitable nonmagnetic material, such as brass, to form a reading gap. Accordingly, bits recorded on the tape generate changes in the magnetic flux of the core portions 120 and 122 as they pass the reading gap. The changes in flux induce currents in the windings 128 and 130 which produce signals to be applied through electrical couplings to a read amplifier circuit.

During recording the large current pulses through the conductors 126 may induce significant voltages in the read windings 128 and 130 to produce an undesirable readback signal. This readback signal may be prevented by providing a compensating turn 134, which is connected to the opposite ends of all the individual writing conductors. In this way, the compensating turn carries a current flow which is the sum of the currents being supplied to the writing conductors 126. A portion of the compensating turn 134 is disposed closely adjacent the reading gap to produce a M.M.F. opposing the M.M.F. generated by the writing currents. As a result, bucking effect reduces the effective flux reaching the readback coils 128 and 130 during writing. The compensating turn 134 in its position adjacent the reading gap is also effective in minimizing writing action by the reading gap due to current flow in the writing conductors during recording.

A more detailed explanation of such magnetic core assemblies is contained in applicant's United States Patent No. 3,159,822, entitled, "Multi-element Magnetic Transducer," and filed January 22, 1962.

In a preferred method of operation, the tape is held stationary at the time of writing, that is, when the current pulses are supplied to the different writing conductors 126. At the completion of the keyboard actuation the tape 32 is advanced past the reading gap to the next character position. During this advance between character positions, each of the bits recorded on the tape passes the reading gap in serial fashion to be read out for verification, as previously explained. The magnetic head assembly 44 thus provides the serial bit-by-bit arrangement of the coded characters on the tape and the serial readout between characters for verification. After completing the recording of a message, the tape may subsequently be driven at a suitable continuous speed to reproduce the bits in serial fashion through the read coils 128 and 130 for transmission.

If desired, the write portion 120 of the core may be provided with an additional write winding 136 coupled to receive serially transmitted data bits. By use of the write winding 136, the bits received may be recorded serially on the tape by the read gap of the core assembly 44. In this way, a buffer unit in accordance with the invention is used to receive data serially transmitted through a transmission line from a remote source.

Figure 6:
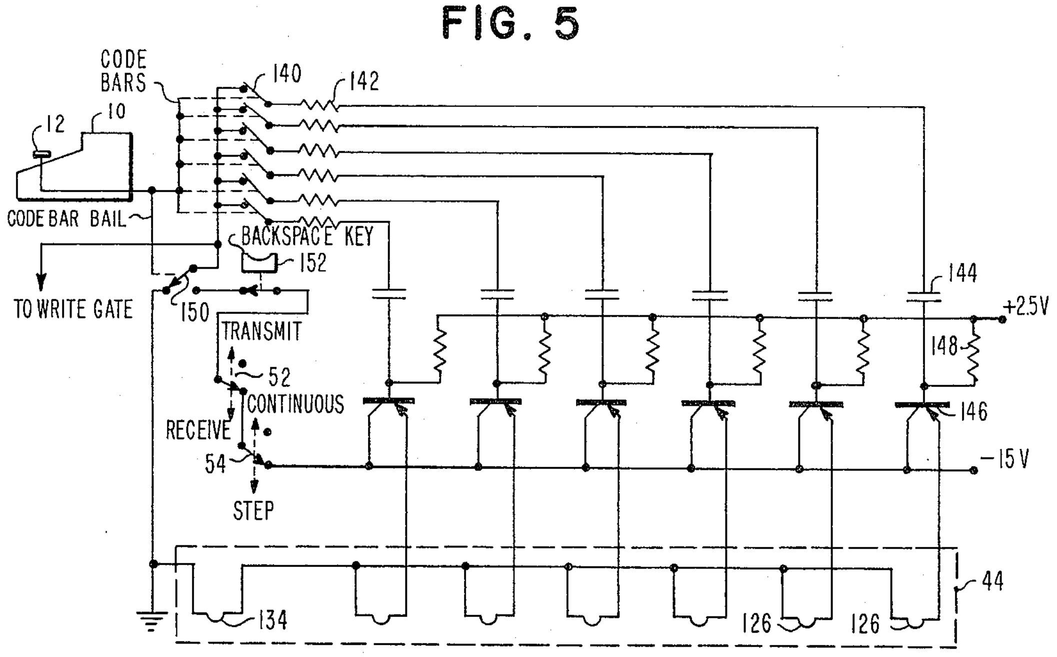
FIG. 6 is a circuit diagram illustrating a current driving circuit for use with a buffer unit in accordance with the invention to record characters received from a keyboard.

Referring now to FIG. 6, there is illustrated one form of a current driving circuit for supplying a multi-digit data character to the write windings 126 on the magnetic core assembly 44. As previously explained herein, each key 12 on the keyboard 10 operates a particular code lever (not shown). Subsequently, as the code bar bail of the keyboard is released, only selected ones of the set of six code bars are free to open their respectice movable code contacts 140, the other code contacts remaining closed to supply a pulse of current to their associated write windings 126.

Each code contact 140 is connected through a separate differentiating R-C circuit, having a small resistor 142 (approximately 33 ohms) and a differentiating capacitor 144 (approximately 0.5 microfarad), to the base terminal of a respective one of the power transistors 146, which may be an inexpensive 2N441 type. Each of the transistors 146 is connected in a common collector fashion and is normally biased to non-conduction by a +2.5 volt supply applied through the resistors 148 (approximately 2000 ohms in value). The collectors of the transistors 146 are supplied from a −15 volt source, and the emitters are coupled through the write windings 126 and the compensating winding 134 to ground. A bail operated movable contact 150 normally couples the movable contacts 140 to ground potential. However, at the end of a ten millisecond interval after the code contacts 140 have been set by depressing a key on the keyboard 10, the movable contact 150 is switched by the code bar bail to its other contact position to apply the −15 volts through the closed code contacts to the respective R-C circuits. Thus, the bases of the respective transistor 146 receive a negative pulse and cause a pulse of emitter current of approximately 0.1 second duration and 4 ampere amplitude to flow through the write windings 126 to record the bits in serial fashion on the tape.

The −15 volts, it should be noted, is provided to the code contacts 140 through the series of contacts operated by the transmit-receive switch button 52, the step-continuous switch button 54, and a backspace key 152 located on the keyboard 10. Accordingly, the writing circuitry is only operative when the switches 52 and 54 are placed in the "receive" and "step" positions and the backspace button 152 has not been depressed. Otherwise, the code contacts 140 are isolated from the associated writing windings 126 by the non-conductive transistors 146.

Figure 7:
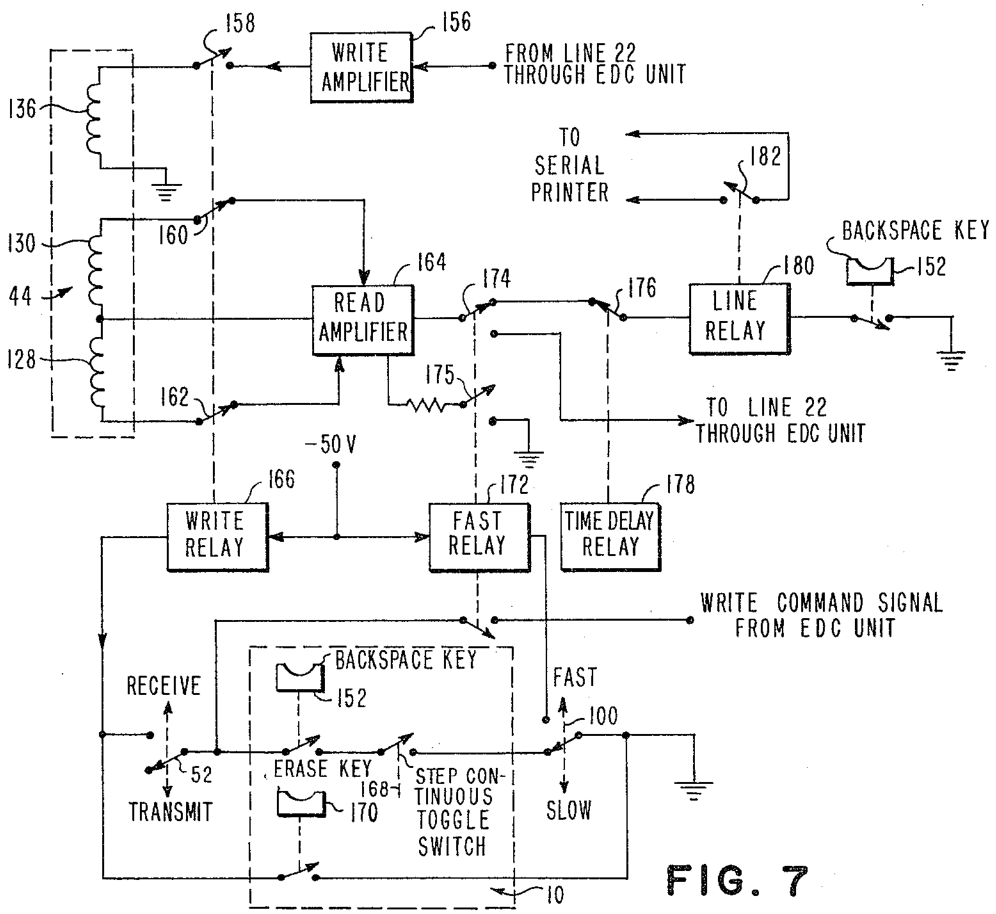
FIG. 7 illustrates a circuit for serially reading and writing by means of the buffer unit; and, FIG. 8 illustrates a control circuit for operating the tape drive arrangement shown in FIGS. 2 and 3.

Referring now to FIG. 7, there is illustrated circuitry for operating the serial reading and writing elements of the buffer unit including the pair of reading coils 128 and 130 and the serial writing coil 136 mounted on the core assembly 44. Bits are received in serial fashion from the line 22 to be delivered by a write amplifier 156 through a contact 158 to the write winding 136 for recording on the tape. On the other hand, bits read from the tape in serial fashion are delivered from the windings 128 and 130 as a balanced input through contacts 160 and 162 to a read amplifier 164. The contacts 158, 160 and 162, which connect the core windings 136, 130 and 138 to the amplifiers 156 and 154, are operated under the control of a write relay 166. In this arrangement, the contact 158 is normally open, while the contacts 160 and 162 are normally closed. When the write relay 166 is actuated, however, the contact 158 is closed to connect the write amplifier 156 to the write winding 136, and the contacts 160 and 162 are opened to disconnect the read windings 128 and 130 from the read amplifier 164.

The write relay 166 becomes actuated only when a circuit is closed from a —50 volt supply through an appropriate path to ground potential. With the selector switches 52 and 100 on the buffer set to their "receive" and "slow" positions, respectively, the write relay 166 is actuated by depressing the backspace key 152, but only if a step-continuous toggle switch 168 has also been closed.

The step-continuous toggle switch 168 may be conveniently located on the keyboard to be closed by the operator to permit the tape to be moved through a series of steps rapidly to a desired position. For example, while a message is being recorded from the keyboard 10, it may be necessary to change or correct the last portion. Alternatively, the toggle switch 168 may be closed to move the tape in the reverse direction to the desired point by holding down the backspace key 152.

Actuation of write relay 166 by means of the keyboard controls results in tape erasure by virtue of bias current supplied from write amplifier 156 to write winding 136. A special erase key 170 is also provided on the keyboard for actuating the write relay 166 when selector switch 100 is in "fast" position for high speed erasure of fairly long portions of the tape.

When the speed change lever switch 100 is moved to the "fast" setting, a circuit is closed from the —50 volt supply through a fast relay 172 to ground for actuation of the fast relay 172. This couples the automatic "write" command signals from the associated EDC unit or other automatic control unit to actuate the write relay 166 upon receipt of a signal from the line 22 if the transmit-receive switch 52 is in the receive position.

The fast relay 172 also controls contacts 174 and 175. Contact 174 transfers the output of the read amplifier 164 from the circuitry associated with local serial printer operation to the pulse shaping circuits and the transmission line via EDC unit. Contact 175 of the fast relay 172 is used to reduce the gain of the read amplifier 164 when the buffer is in fast mode to prevent pulse distortion. When the relay 172 is not activated signal flow from the read amplifier 164 to serial printer is under control of time delay relay 178 and associated contact 176. This relay is actuated with every character key operation, and involves a delay of approximately 20 milliseconds for closure of contact 176 in order that amplifier transient signals are dissipated before output is delivered to the serial printer via line relay contacts 182. Printer operation during reverse tape feed commanded from the keyboard is prevented by opening of a contact associated with backspace key 152.

Figure 8:
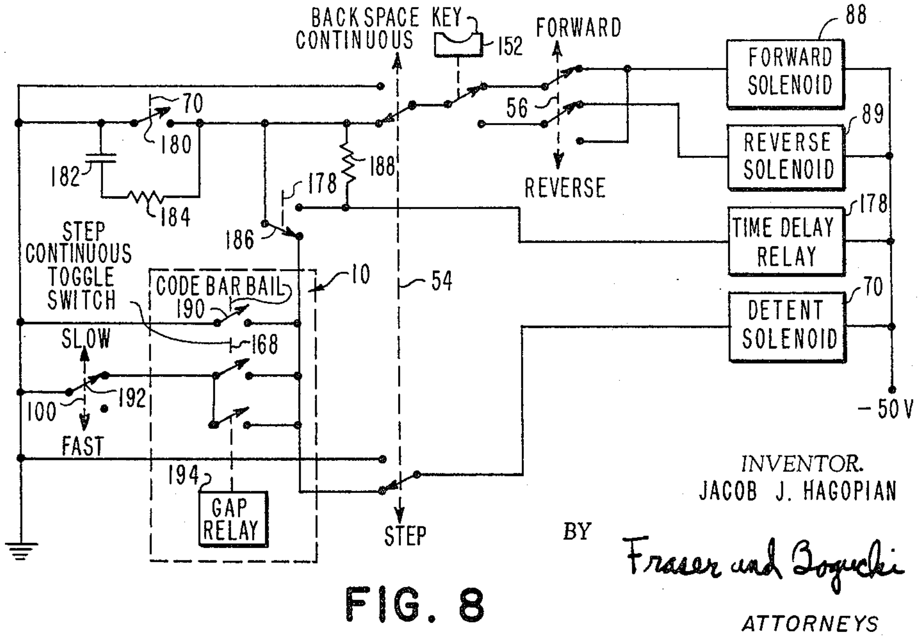

The control circuitry for the drive system of a data transmission buffer unit in accordance with the invention is illustrated in FIG. 8. The forward solenoid 88, the reverse solenoid 89, the detent solenoid 70 and the time delay relay 178, each have one terminal coupled to a common —50 volt supply so that they may be actuated by completing a circuit to ground. A pair of ganged movable contacts are operated by the forward-reverse switch 56. When the switch 56 is in the "forward" setting, the upper ganged contact is coupled to the forward solenoid 88 and the lower contact to the reverse solenoid 89, whereas in the "reverse" setting, the coupling of the ganged contacts is reversed so that the upper contact is connected to the reverse solenoid 89 and the lower contact is connected to the forward solenoid 88. Thus a change in the position of the forward-reverse switch 56 reverses the couplings to the solenoids 88 and 89. A movable contact operated by the backspace key 152 is normally connected through the upper contact of the ganged pair to one of the solenoids 88 or 89. By depressing the backspace key 152, the movable contact becomes connected through the lower ganged contact to the opposite solenoid 89 or 88 to reverse the direction of tape travel.

If the continuous-step switch 54 is placed in the "continuous" setting, a circuit to ground is maintained to ground through an associated contact operated by the switch. This actuates the detent solenoid 70, thereby allowing the detent wheel 38 to freely rotate for continuous operation. On the other hand, when the switch 54 is in the "step" setting, the contacts operated by the switch 54 are connected as shown in FIG. 8. The coupled solenoid 88 or 89 is connected through a normally open contact 180, which is closed only by actuation of the detent solenoid 70. The normally open contact 180 is, however, bypassed by an R-C charging circuit containing the capacitor 182 and the resistor 184.

The "step" setting of the switch 54 also normally connects the detent solenoid 70 through a movable relay contact 186 operated by the time delay relay 178, to the normally open contact 180. The time delay relay 178 is likewise normally connected to the normally open contact 180 through a circuit limiting resistor 188, which has a substantially greater resistance value than the bypassing resistor 184. Therefore, with the contacts in their normal position as shown in FIG. 8, no current path to ground is established for actuating the solenoids 70, 88 or 89 or the time delay relay 178.

Assume now that a key on the keyboard 10 is operated. The code bar bail closes a normally open contact 190 to establish a circuit to ground for actuating the forward or reverse solenoid 88 or 89, the time delay relay 178 and the detent solenoid 70. Actuation of the detent solenoid 70 causes a normally open contact 180 to be closed to discharge the capacitor 182 and the detent pin 68 to be withdrawn to release the detent pulley 64. Subsequently, when the contact 190 opens upon release of the code bar bail, the detent pin 68 is still riding on the tooth crown of detents 66 so that the contact 180 remains closed to keep the selected drive solenoid energized until the tape feed step is completed. This happens when detent pin 68 falls into the next slot of detents 66, allowing the contact 180 to open, thus de-energizing the forward or reverse solenoids 88 or 89, as well as the time delay relay 178.

The momentary closure of the contact 190 also connects the time delay relay 178 through the resistor 188 to ground potential. The actuating coil of this time delay relay 178 has substantial inductance so that the actuating current increases gradually to a maximum. Accordingly, with the resistor 188 coupled in series with the coil, the relay 178 does not receive sufficient actuating current for a fixed interval (approximately 20 milliseconds) after the contact 190 has been closed by operation of a code bar bail. Upon actuation, the relay 178 then switches the movable contact 186 to bypass the current limiting resistor 188, while at the same time decoupling the detent solenoid 70 from the circuit through the contact 180. When the resistor 188 is bypassed, the current through the time delay relay increases to maintain the time delay relay 178 actuated while the capacitor 182 charges. Subsequent de-activation of relay 178 and solenoid 88 or 89 by means of detent pin 68 which controls contact 180 was described in the previous paragraph.

During the recording of the message from the keyboard 10, the speed change lever 100 is set in its "slow" position, which closes an attached movable contact 192 in the control circuit. This establishes a first portion of an alternative circuit to ground that may be completed by closing either the step-continuous toggle switch 168 or by operation of a gap relay 194, both of which are included on the keyboard 10. As previously mentioned, the toggle switch 168 is closed by the operator during a recording operation to permit the tape to be moved continuously at the slow speed to a desired position. During the interval that the toggle switch 168 is closed, a ground connection is maintained through a normally open contact to actuate the detent solenoid 70 and the forward or reverse solenoid 88 or 89 so that the tape moves to the desired position. The normally open movable contact 180, which is operated by the detent solenoid 70, also remains closed during this interval. Upon opening of the toggle switch 168, the detent solenoid 70 is immediately deactuated, whereas the forward or reverse solenoid 88 or 89 remains actuated until the detent pin 68 falls into the next slot of the detent 66.

Actuating the gap relay 194 provides a similar operation. The gap relay 180 may be actuated automatically for a fixed ten character interval after one hundred fifty characters have been recorded in a block on the tape. During the ten character interval, a normally open contact operated by the gap relay 194 is closed to complete a circuit to ground through the contact 192. This ten character gap, in which no characters are recorded, defines the interblock gap before recording of the next block of characters. During transmission of a message so recorded, these interblock gaps may be sensed by appropriate electronic circuits to initiate the parity check operation.

Various features of a data transmission buffer system in accordance with the invention have been described herein together with various cooperating devices to permit a complete understanding of the invention. However, it should be understood that data transmission buffer systems in accordance with the invention are extremely versatile and may be used in a wide variety of applications. For example, this system may be used advantageously with code operated typewriter systems for prerecording standard materials to be automatically typed. Frequently standard materials are first recorded with a buffer system during a typing operation for later reproduction by operation of a serial printer. The standard materials recorded may also be revised and corrected on the magnetic tape as changes in the content become necessary. Other applications, such as data collection and transmission, remote computer programming and typesetting, and high speed satellite communications will be obvious to those skilled in the art.

An actual buffer unit of this type provides the following operating characteristics and advantages. In the particular application described, the data is recorded on the tape with a density of ten characters to the inch, that is, each fixed incremental movement of the tape is one-tenth of an inch. In the high speed mode, the tape speed is sixteen inches per second and is attained in less than twenty-five milliseconds after initiating a continuous operation in either dircetion. Maximum low tape speed is one inch per second. The entire unit may be powered by a single 1/50 horsepower, 1800 r.p.m. synchronous motor to drive the high speed capstan at 2400 r.p.m. and the low speed capstan at 150 r.p.m. The cantilevered spring mounting of the arms 82 and 98 permits economical manual speed selection. Accordingly, the present buffer unit operating in the high speed mode can provide a transmission rate of one hundred sixty characters per second, which is compatible with present data telephone systems and significantly faster than even the most sophisticated and more costly punched tape units.

Similar systems in accordance with the invention might be designed for high tape character densities and tape speeds to operate with one hundred character per second serial page printers and even with high speed transmission links at thousands of characters per second. The speeds and data transfer rates given in the above particular example are lower than would be employed for many of these applications only because of the requirements of the particular example. The same basic mechanisms may be utilized for the much higher densities, speeds and data transfer rates required for high speed output devices and communications links.

Additionally, the above has not considered in detail the advantages of the invention as applied to situations requiring a buffer-serial printer combination. Here, as with a one hundred character per second printer, the asynchronous capability of the magnetic tape unit eliminates substantially all need for an intermediate buffer unit. To this end, the data acquired at the recorder can be played back, character by character, to control the printer. Substantially the only control function which need be supplied is that of stepping the systems together during data transfer. This system therefore provides an extremely low cost output device for an information retrieval system.

While the invention has been particularly shown and described with reference to a preferred embodiment thereof, it will be understood by those skilled in the art that various changes in the form and details may be made herein without departing from the spirit and scope of the invention.

What is claimed is:

1. A data transmission buffer for asynchronously recording and reproducing data comprising: means for receiving a multi-bit coded signal representative of the character, a magnetic tape having a single recording channel, a magnetic transducer connected to receive the multi-bit coded signal from the receiving means and positioned in recording relationship with the single channel on the magnetic tape, said magnetic transducer including writing means defining a plurality of recording gaps for simultaneously recording the bits of the coded signal received in parallel lengthwise on the single channel when the tape is stationary with respect to the magnetic transducer and including reading means including a single reading gap disposed in reading relationship to the tape closely adjacent one of said recording gaps, means for moving the tape at selected speeds relative to the magnetic transducer, means for restricting the movement of the tape during the recording of the multi-bit coded signal, said restricting means permitting the tape to move a single increment at one of said selected speeds after each recording of a multi-bit coded signal, the length of each increment corresponding to the distance between the reading gap and the furthest recording gap on the magnetic transducer such that the signals recorded pass the reading gap to be reproduced during the incremental movement, whereby the parallel bits representing a character are recorded in serial fashion on the tape to be later reproduced serially at different ones of the selected speeds.

2. A data transmission buffer for asynchronously recording and reproducing digital data comprising: means for receiving a multi-bit coded signal representative of the characters, a magnetic tape having a single recording channel along the tape, a magnetic transducer connected to receive the multi-bit coded signal from the receiving means and positioned in recording relationship with the signal channel on the magnetic tape, a magnetic transducer including recording means defining a plurality of recording gaps successively positioned along the length of the single channel on the magnetic tape, the recording means being coupled to receive the bits of the coded signal such that the bits are recorded in parallel lengthwise relationship on the single channel, a magnetic transducer also including with reproducing means defining a single reading gap disposed adjacent said plurality of recording gaps along the single channel, tape transport means coupled to the tape for advancing the tape at at least two selected speeds past the magnetic transducer, the tape transport means including means for restricting the movement of the tape during the recording of a multi-bit coded signal, said restricting means permitting the tape to move a single increment at one of said selected speeds after each recording of a multi-bit coded signal, the length of each increment corresponding to at least the distance between the reproducing gap and furthest recording gap on the magnetic transducer, such that the signals recorded for a given character pass the reading gap during the increment of movement to be reproduced during the movement, whereby the parallel data bits representing the character are recorded in serial fashion on the tape for later reproduction serially at either one of the selected speeds.

3. The invention as set forth in claim 2 above, wherein the magnetic tape comprises a sprocketed tape and wherein the means for restricting the movement of the tape comprises a sprocket advance mechanism.

4. An incremental recorder for serially recording the parallel bits of a multi-bit coded signal comprising: a magnetic tape having a single longitudinal recording track; tape driving means responsive to each multi-bit binary signal for longitudinally advancing the tape by a fixed increment; a magnetic transducer having a plurality of recording gaps disposed longitudinally along a single recording track to record the parallel bits serially when the tape is stationary with respect to the magnetic transducer, said fixed increment corresponding to the spacing across all of the recording gaps; and reading means including means for driving the magnetic tape at a continuous speed and magnetic reproducing means defining a gap disposed in reproducing relationship to the single track of the tape for reading the serially recorded bits from the tape in a continuous sequence.

5. An asynchronous magnetic tape digital recording system, for recording intermittently provided multi-bit characters which are serial by character and parallel by bit and obtained from operation of a key operated unit, comprising: a magnetic tape having a single recording channel; a magnetic transducer coupled to the key operated unit to receive the multi-bit coded signal and positioned in recording relationship with the single channel on the magnetic tape, the magnetic transducer including a plurality of recording gaps spaced longitudinally along the single recording channel and means to simultaneously record a different bit of each character at a different one of the gaps; and tape driving means responsive to each operation of the key operated unit for advancing the tape longitudinally a fixed increment after each recording operation, the fixed increment substantially corresponding in length to the distance across all of the recording gaps, whereby the multi-bit coded signals are recorded in serial bit-by-bit fashion on the magnetic tape for later continuous high speed reproduction.

6. A buffer system for recording multi-bit coded signals originated at an asynchronous input device comprising: a magnetic tape having a single recording channel; a magnetic transducer connected to receive the parallel bits of a multi-bit coded signal from the input device, said magnetic transducer including a plurality of recording gaps for simultaneously recording the separate bits of a coded signal longitudinally on the signal tape channel when the tape is stationary and a reproducing gap disposed closely adjacent the recording gap which is farthest upstream of the direction of tape advance; means for advancing the tape after each recording operation in fixed increments in response to each operation of the input device, the length of the fixed increment corresponding to the distance between the reproducing gap and the farthest downstream recording gap so that the bits recorded are advanced past the reproducing gap and reproduced in serial fashion during the incremental movement, and means responsive to the serial reproduction of the recorded bits to provide a visual indication of the recorded character to be compared with the input device operation, whereby the proper recording of an input device originated signal on the magnetic tape may be verified by an operator of the input device.

7. The buffer system of claim 6 further including means for advancing the tape continuously past the reproducing gap, said magnetic transducer being responsive to the serially recorded bits on the tape to reproduce the recorded bits; and means for transmitting the serially reproduced bits in a continuous serial bit-by-bit fashion.

8. An asynchronous recorder for serially recording the parallel bits of multi-bit coded signals comprising: a magnetic tape having at least one longitudinal recording track; magnetic transducer means including means for recording each multi-bit coded signal in serial bit-by-bit fashion longitudinally on a fixed increment of the recording track; tape driving means responsive to each multi-bit coded signal for longitudinally advancing the tape a fixed increment; means including a single reproducing gap for reproducing the recorded bits in serial fashion when the tape is advanced a fixed increment; and means responsive to the reproduced bits for providing a visual indication of each recorded multi-bit coded signal.

9. An asynchronous recording system for serially recording multi-bit characters provided intermittently as parallel bits from a key operated unit, comprising: a magnetic tape having at least one longitudinal recording track; driving means responsive to each character for longitudinally advancing the tape in fixed increments, a magnetic transducer having a plurality of recording gaps disposed longitudinally along the recording track to record the parallel bits of a character serially when the tape is stationary with respect to the magnetic transducer; magnetic reproducing means including a reproducing gap disposed in close juxtaposition to the recording means downstream of the direction of tape advance, said fixed increments corresponding to the spacing between the first recording gap and the reproducing gap so that the last bits recorded are advanced past the reproducing gap to be reproduced in serial fashion during the incremental movement; and a serial printing device responsive to the serially reproduced bits of character to print the recorded character to be compared with the characters chosen on the key operated unit.

10. A data transmission system of asynchronous input and output data transfer and high speed serial transmission of multi-bit digitally coded characters, comprising: an asynchronous input device providing character data in the form of parallel bits; an asynchronous output device providing printed output characters in response to serial character data; a first stepping tape recorder system, including means responsive to the input device for simultaneously recording all bits of each character serially on a single recording track, means for stepping the tape a fixed distance in response to each character provided from the input device, means for advancing the tape at a higher continuous speed, and means for serially reproducing the bits of each character during both stepping and continuous movement; a second stepping tape recorder system including means to record data synchronously at the selected higher constant speed and means to reproduce the characters asynchronously to control said output device; and a data transmission link coupled to transmit data reproduced at the continuous speed from the first recorder system to the second recorder system.

11. An asynchronous tape recorder for recording individual multi-bit characters in a regularly spaced format as they are provided in parallel bit form comprising: a magnetic tape; tape driving means for moving the magnetic tape in fixed advancing increments, recording means responsive to the individual multi-bit characters and operatively associated with the tape for simultaneously recording bits of a character on the tape in a single track; reproducing means disposed downstream of the direction of tape advance in close juxtaposition to the recording means, the fixed advancing increments being substantially equal to the spacing between the leading edge of the recording means and the trailing edge of the reproducing means, so that the recorded bits are serially reproduced by the reproducing means during the movement of the tape.

12. In a data transmission system, the combination comprising: a keyboard unit including a plurality of character keys; means for generating a different multi-bit coded signal in response to the operation of each character key; a magnetic tape having a single recording channel; a magnetic transducer connected to said signal generating means and positioned in recording relationship with the single recording channel on the tape; said transducer comprising writing means having a plurality of gaps for recording in parallel the bits of a coded character signal lengthwise on said single channel when the tape is stationary with respect to the magnetic transducer and reading means defining a single reproducing gap disposed in reading relationship to said tape; means responsive to the operation of each character key for moving the tape in fixed increments after each recording operation, the length of said fixed increment corresponding to the distance between the reproducing gap and the furthest gap of said writing means, so that the bits recorded may be read during the incremental movement by said reading means to provide a plurality of bits arranged in serial fashion corresponding to the coded signal recorded on the tape; a device responsive to the serial bits from the reading means to provide a visual indication of the character recorded; a data transmission link; means for driving the tape at a continuous high speed after a message having a plurality of characters has been recorded; and means selectively connecting said reading means to said data transmission link during operation of the driving means, whereby data previously recorded on the tape and verified by said visual indication may be transmitted at high speed over the data transmission link.

13. The data transmission system of claim 12 wherein said magnetic tape contains sprocket holes; said means for incrementally moving the tape includes a pulley having sprockets for engaging the sprocket holes in the tape on both sides of the magnetic transducer, said tape pulley having equally spaced detent positions thereon; means disposing said tape in a closed loop tape path adjacent asid magnetic transducer; a pin for engaging the detent positions on the tape pulley; said means for moving the tape further including means for selectively disengaging the pin from the detent position to allow rotation of the tape pulley to the next detent position in response to the operation of a character key and for continuously disengaging the pin from the detent positions in response to the operation of said driving means; and wherein said data transmission system further includes a speed change system for driving the tape pulley at a slow speed between adjacent detent positions and at a high speed during transmission over the tranmsission link.

14. In a data transmission buffer system, a tape recorder for asynchronously recording individual multi-bit characters in a regularly spaced format as they are provided in parallel bit form and for reproducing the multi-bit characters in synchronous serial bit form comprising: a magnetic tape with equally spaced sprocket holes therein; a magnetic transducer assembly having a recording portion for recording parallel bits in serial fashion on fixed increments of the tape and a reading portion for reading the recorded bits one at a time from the tape; a sprocket wheel for driving the tape, said sprocket wheel having sprockets equally spaced at the periphery to engage sprocket holes provided in the tape; and means disposing said tape in a tight loop tape path adjacent said transducer assembly, said disposing means including first and second pairs of symmetrically placed guide rollers adjacent opposite sides of the sprocket wheel, each pair of guide rollers providing equal tape lengths in contact with the sprocket wheel, a spring tensioned guide roller and an adjustable position guide roller located on opposite sides of said transducer assembly for disposing an intermediate length of tape in a predetermined wrap angle across the recording and reproducing portions of the magnetic transducer assembly, the tape passing from one side of its sprocket wheel to the spring tensioned guide roller and from the other side of said sprocket wheel to the adjustable position guide roller, said spring tensioned guide roller providing a constant tension to the tight loop tape path to maintain the sprockets on one side of the sprocket wheel in engagement with the leading edge of the sprocket holes in the tape and the sprockets on the other side of the sprocket wheel in engagement with the trailing edge of the sprocket holes to prevent tape backlash upon changing the direction of tape movement, and said adjustable position roller being movable with respect to said transducer assembly to properly align the tape increments with the recording and reproducing portions of the transducer assembly.

References Cited by the Examiner

UNITED STATES PATENTS

| | | | |
|---|---|---|---|
| 3,012,230 | 12/1961 | Galas | 340—172.5 |
| 3,092,810 | 6/1963 | Schmidt | 340—172.5 |
| 3,109,603 | 11/1963 | Berlant | 242—55.12 |
| 3,130,933 | 4/1964 | Pillsbury | 242—55.12 |
| 3,157,867 | 11/1964 | Burns | 340—174.1 |
| 3,159,822 | 12/1964 | Hagopian | 340—174.1 |
| 3,176,278 | 3/1965 | Mayer | 340—174.1 |

R. ZACHE, *Assistant Examiner.*
ROBERT C. BAILEY, *Primary Examiner.*

UNITED STATES PATENT OFFICE
CERTIFICATE OF CORRECTION

Patent No. 3,275,995 September 27, 1966

Jacob J. Hagopian

It is hereby certified that error appears in the above numbered patent requiring correction and that the said Letters Patent should read as corrected below.

Column 2, line 4, for "sped" read -- speed --; column 3, line 23, for "producing" read -- reproducing --; line 51, for "FIGURE" read -- FIG. --; column 6, line 19, for "blacklash" read -- backlash --; column 8, line 44, for "spectice" read -- spective --; column 11, line 71, for "dircetion" read -- direction --; column 14, line 52, for "bits of" read -- bits of a --; line 55, for "of" read -- for --; column 15, line 56, for "asid" read -- said --; column 16, line 7, for "tranmsission" read -- transmission --.

Signed and sealed this 5th day of September 1967.

(SEAL)
Attest:

ERNEST W. SWIDER
Attesting Officer

EDWARD J. BRENNER
Commissioner of Patents